April 21, 1964  R. A. RISCHARD ETAL  3,130,259
SPLICE BOX WITH CABLE ENTRANCE SEALS
Filed June 11, 1962  4 Sheets-Sheet 1

INVENTORS
ROBERT A. RISCHARD
WILLIAM P. WALSH
RALPH G. D'ASCOLI
V. F. Volk
THEIR AGENT April 21, 1964 R. A. RISCHARD ETAL 3,130,259
SPLICE BOX WITH CABLE ENTRANCE SEALS
Filed June 11, 1962 4 Sheets-Sheet 2

INVENTORS
ROBERT A. RISCHARD
WILLIAM P. WALSH
RALPH P. D'ASCOLI
THEIR AGENT

INVENTORS
ROBERT A. RISCHARD
WILLIAM P. WALSH
RALPH G. D'ASCOLI
*THEIR AGENT*

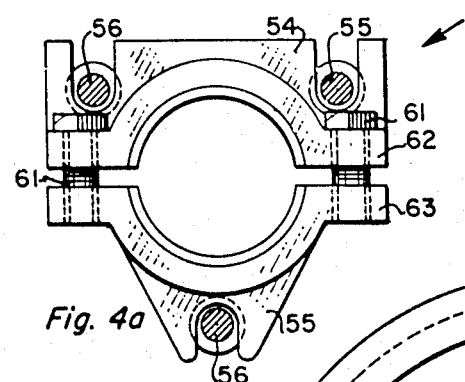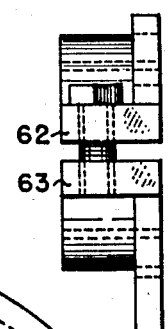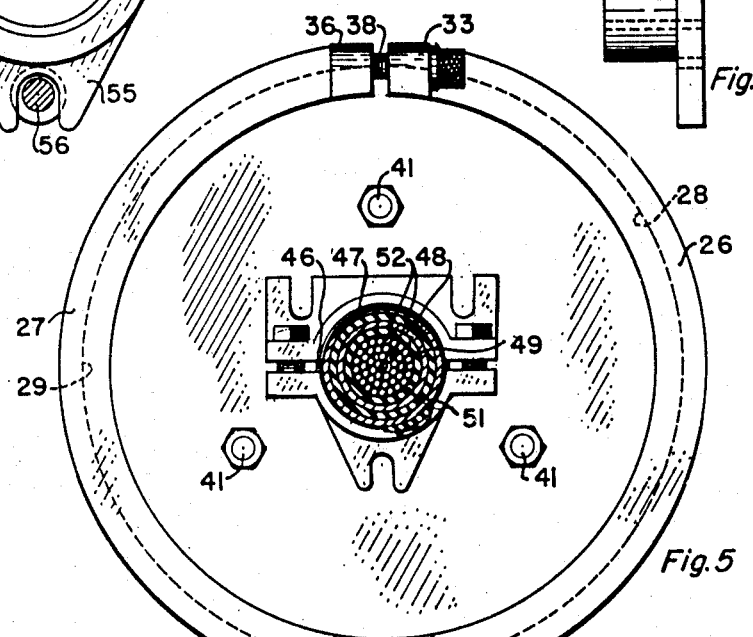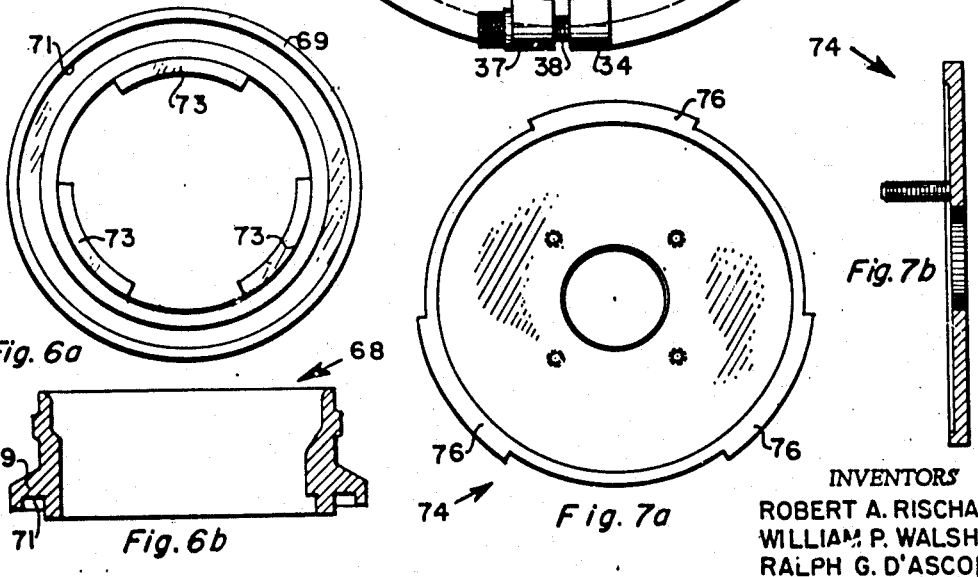

United States Patent Office 3,130,259
Patented Apr. 21, 1964

3,130,259
SPLICE BOX WITH CABLE ENTRANCE SEALS
Robert A. Rischard, William P. Walsh, and Ralph G. D'Ascoli, Yonkers, N.Y., assignors to Anaconda Wire and Cable Company, a corporation of Delaware
Filed June 11, 1962, Ser. No. 201,446
14 Claims. (Cl. 174—93)

Our invention relates to cable splice boxes and particularly to splice boxes and associated entrances for pressurized double-sheathed, double-jacketed cables.

Cables of the type for which our splice box is particularly, but not limitedly, applicable have an inner core comprising, in addition to one or more insulated electrical conductors, a fluid such as a gas under pressure, and an insulating jacket. The cables comprise a sheath such as a corrugated steel sheath over this jacket, another insulating jacket over the sheath, an outer sheath such as a corrugated copper sheath over the last-named jacket and an outermost jacket overall. The aforementioned jackets are fashioned of organic materials but the same material is not necessarily used for each jacket. When polyethylene is employed for one or more of the jackets it has been a particular problem to provide a tight seal because of the well-known difficulty of bonding to polyethylene surfaces. Another problem is that the outer surface of the cable may not be smooth but follow to a greater or lesser degree the convolutions of an underlying corrugated sheath.

The jacket that is sandwiched between the outermost sheath and its underlying sheath separates the two electrically for cable fault testing purposes, and it is necessary to maintain the insulation between the sheaths within the splice box. It is also necessary to transfer tensional stresses in the cable to the box so that they do not strain the conductor splices themselves. Additionally it is very desirable that entrance into the splice box be rapidly and easily effected although the case is of very rugged construction.

The splice box to which our invention is directed has an inner chamber which contains the splice and into which the pressurized gas in the cables may flow freely. It is necessary that this inner chamber should remain pressure-tight for long periods and to this end we have invented a cable entrance of novel structure. The splice box also has an outer chamber within which the inner chamber is wholly contained. The outer chamber is electrically insulated from the inner chamber but is grounded to the outer sheath of the cable while the inner chamber is grounded to the inner sheath. The entrance to the outer chamber should be moisture-tight but it is not essential to maintain a pressure seal since all the pressurized gas is retained in the inner chamber. The outer chamber, however, as well as the inner chamber, must withstand any tensile forces in the sheath which would otherwise be transferred to the splice and our invention includes novel means for transferring any such forces to the walls of the chamber.

Although it is necessary to main a seal between the cable and the inside chamber that will not leak under pressure, it is also necessary to have repeated access to the splice. To achieve both of these contradictory purposes we have invented an entrance with an entrance shoulder affixed to the chamber walls and an inside plate that surrounds the cable and abuts this shoulder. Our entrance also comprises a composite outside plate that extends radially beyond the inside plate and comprises inner and outer members in the form of concentric discs. The outer member has an inwardly facing projection and the inner member abuts this projection so that it is held in position toward the inside plate.

There are fluid-tight sealing means between the outer member and the shoulder, between the plates and the cable, and between the inside and outside plates; and means urging the outer plate toward the shoulder and the inner plate toward the outer plate. By these means the seal to the cable and between the plates can remain unbroken while access to the cable splice is gained by separating the outer member of the outside plate as will hereinafter be more fully described.

Preferably our means of urging the outer member of our outside plate toward the shoulder is a wedging clamp.

Our complete splice box conveniently comprises an outer tubular shell with tapered flanges on both ends, and end plates with tapered flanges matching the flanges of the shell and with apertures to fit the cable. Wedging clamps which fit the flanges are used to hold the plates to the shells. To transfer tensile stresses in the cable to the shells of the splice box, embodiments of our invention have cable-gripping clamps fastened to the inside one of both the outer and inner plates by means that pass through apertures in the outside plates. The clamps preferably comprise arcuate sections of a cylinder and means for tightening them around the cable.

An alternative means of transferring tensile stresses in the cable to the frame of the pulse case comprises fiber-reinforced resinous bonds such as epoxy bonds to the cable sheaths. For such a bond the outermost jacket is terminated substantially flush with the outer plates exposing the outermost sheath. This sheath is terminated between the outer and inner plates leaving a length exposed adjacent the termination of the outermost jacket and the inner jacket is also terminated between the inner and outer plates with a length of the inner jacket exposed adjacent to the termination of the inner sheath. In this embodiment of our invention the splice includes a covering of fiber-reinforced self-curing resin bonding to the exposed sheaths and bridging the exposed jacket which will preferably have a plurality of spaced-apart wraps of adhesive tape bonded to it under the resin. To transfer the tensile stresses directly to the plate at least one L-shaped stop is fastened to the outermost sheath abutting the plate, with the fiber-reinforced resin covering one leg of the stop and binding it to the sheath.

In another preferred embodiment of our invention which provides a moisture-tight seal to the outer shell without any requirement for space sealing gaskets, a smooth-surfaced metal sleeve passes through the aperture in the outer plate and extends over the outermost cable jacket. This sleeve has a flange abutting the plate and taking the place of the L-shaped stops. The flange is bonded by the resin to form a fluid-tight bond to the sheath. Here we have also provided a resilient sleeve, bonded to the plate, and fitting snugly over the extended portion of the metal sleeve.

A more thorough understanding of our invention may be gained from a study of the appended drawing.

In the drawing:

FIGURE 4a is a front view of a clamp shown in FIGURE 1.

FIGURE 4b is a side view of the clamp of FIGURE 4a.

FIGURE 5 is a view through the section 5—5 of FIGURE 1.

FIGURES 6a and 6b are a front view and side section respectively of an element of our invention.

FIGURES 7a and 7b are a front view and side section respectively of an inside plate used in our invention.

Figure 1:
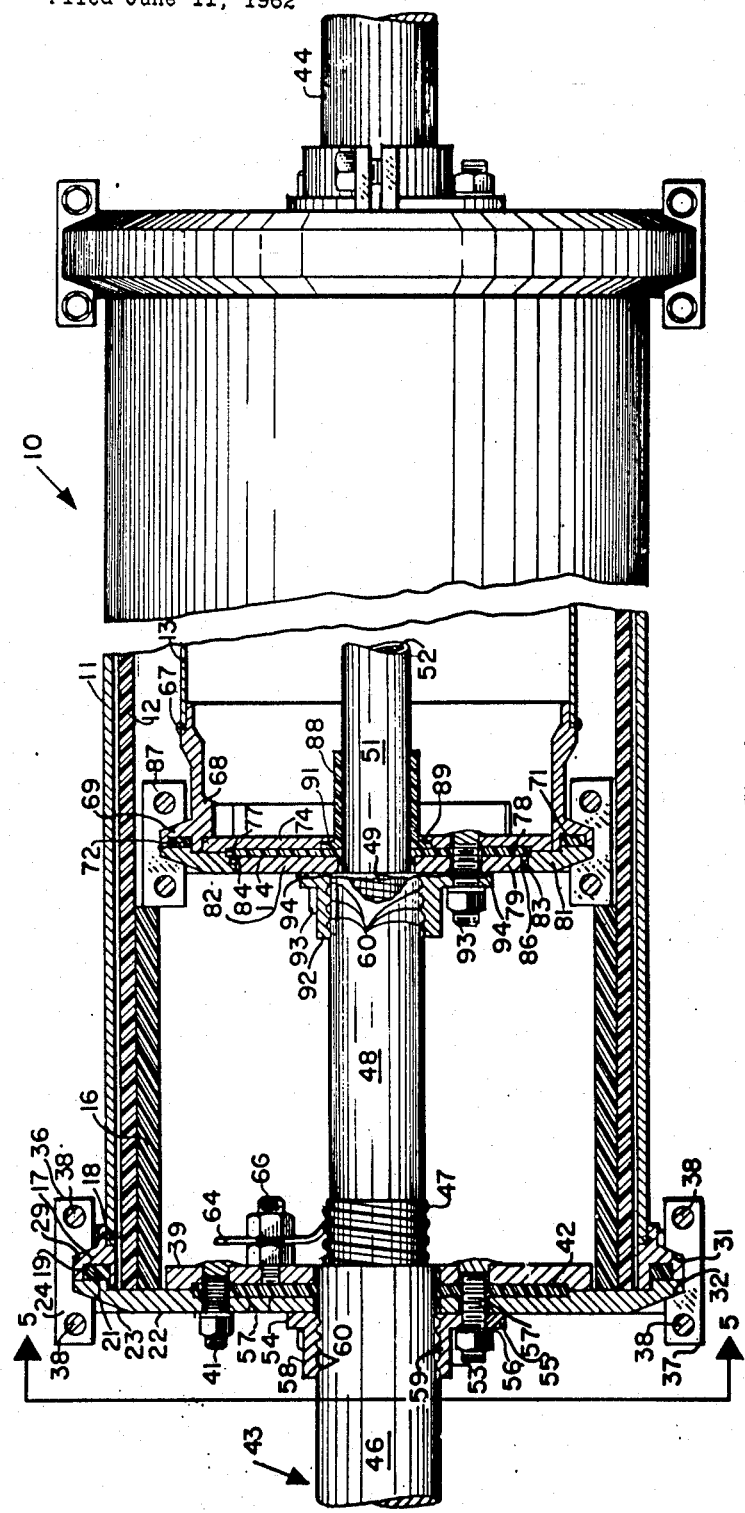
FIGURE 1 is a lengthwise sectionalized view of a splice box of our invention.

Referring to FIGURE 1 a splice case indicated generally by the numeral 10 has an outer cylindrical housing 11 which may be a metal such as copper in the form of a tubular shell, a dielectric cylindrical liner 12 of a nonmetallic material such as polyethylene and an inner cylinder or tubular shell 13 which may be a metal such as steel and forms the outer wall of an inner casing 14. A cylindrical spacer 16 which may be made of the same material as the liner 12 positions the inner casing within the housing 11. We have shown the left-hand portion of the case 10 in detail but it will be understood that the right-hand portion will most usually be identical but it may comprise an entrance for a different number of cables than the left-hand portion of the same case. A tapered flange 17 is hermetically brazed to the housing 11 by means of a brazing-ring 18. The flange 17 has a circular groove 19 for a sealing gasket 21 which seals the flange to an outside plate 22. The plate 22 has a peripheral tapered portion 23 which, together with the flange 17, fits into the groove of a wedging clamp 24. The clamp 24 is comprised of two semi-circular sections 26, 27 (FIGURE 5) each of which defines one of similar grooves 28, 29 with sloping walls 31, 32. The section 26 has lugs 33, 34 and the section 27 has respectively matching lugs 36, 37 so that the sections can be urged together by means of bolts 38. Fitting within the spacer 16 an inside plate 39 is bolted to the plate 22 by means of headed bolts 41. The plates 22, 39 are recessed to hold an extrudable sealing-compound disc 42 as described in application Serial Number 150,755, filed November 7, 1961, and assigned to the assignee of the present application.

A cable indicated generally by the numeral 43 enters the case 10 through the plates 22, 39 and a similar cable 44 enters the case 10 from the opposite end. Although we have shown a single cable it will be understood that two (see FIGURE 2) or more cables may be brought into one or both of the ends of our case 10 within the scope of our invention. The cable 43 has an organic outer jacket 46 covering a metallic corrugated sheath 47, an inner dielectric jacket 48 covering an inner corrugated sheath 49, and a more inwardly jacket 51 covering a core comprised of insulated conductors 52 which are to be spliced.

In order to transfer any tension in the cable 43 to the case 10 a clamp 53 (see also FIGURES 4a and 4b) having flanges 54, 55 is fastened to the inside plate 39 by means of threaded pins 56 which pass freely through apertures 57 in the plate 22 and are brazed to the plate 39. The clamp 53 has two semicircular gripping projections 58, 59 with serrations 60 on the gripping surfaces. The two projections 58, 59 are drawn tightly together around the cable 43 by means of bolts 61 passing through projecting lugs 62, 63 in the clamp 53. From the foregoing it is evident that a considerable portion of any tension in the cable 43 will be transferred by means of the clamp 53 to the plate 39 which will be compressed against the plate 22 which will in turn transfer the tensional load through the wedging clamp 24 and flange 17 to the housing 11. Inside of the plate 39 a length of the sheath 47 is exposed and grounded to the plate 39 by means of a grounding wire 64 and threaded pin 66.

The inner cylinder 13 is hermetically welded by means of a weld 67 to a cylindrical extension 68 (as shown on a reduced scale in FIGURES 6a and 6b) terminating in a tapered flange 69 having a circular groove 71 for a sealing gasket 72. The extension 68 has a plurality of inwardly facing ears 73 and there is an inside plate 74 (see also FIGURES 7a and 7b) with radial ears 76 which abut the ears 73. The face of the plate 74 has a recess 77 fitting a sealing disc 78 of the same material as the disc 42. Facing the flange 69 and the plate 74 is an outside composite plate 79 made up of a tapered outer member 81 and an inner member 82. The member 81 has an inwardly facing shoulder 83 that matches an annular projection 84 of the inner member 82 and urges said inner member against the disc 78. The outer member 81 is recessed at 86 to receive the disc 78 so that the disc 78 effectively seals the joint between the inner member 82 and outer member 81 of the outside plate 79. A wedging clamp 87 similar to, but of smaller diameter than, the clamp 24 fits the tapered member 81 and the flange 69 and compresses them together with the gasket 72 effecting a seal between them. The plates 74 and 79 have matching central apertures for the entrance of the jacketed core of the cable 43 and the size of the apertures is such as to permit a seal against the jacket 51. As described in the aforementioned application Serial Number 150,755, this seal is effected by the extrusion of the compound of the disc 78 against the jacket 51 but an additional seal has been obtained in the embodiment shown by the use of a flanged plastic collar 88 where the flange 89 is compressed in a recess 91 of the plate 74. The tubular portion of the collar 88 is cemented to the jacket 51 by suitable means. Where the jacket 51 is polyethylene the collar 88 is advantageously also formed of polyethylene and can be cemented by means of the compound disclosed in copending application Serial Number 190,108 filed April 25, 1962, and assigned to the assignee of the present invention.

A clamp 92 smaller in diameter but otherwise identical in operation to the clamp 53 is fastened to the plate 74 by threaded pins 93 which pass through holes in the member 79 and are attached, as by welding, to the plate 74. The clamp grips the cable over the jacket 48 and transfers any residual tension in the cable to the inner cylinder 13. In addition, the sheath 49 is slit with a plurality of cuts and folded into radial tabs 94 between the clamp 92 and the plate 79. It can be seen that the entrance to the inner casing 14 is tightly sealed by the means described, since the entrance around the cable is sealed by the disc 78 and also the collar 88 which is cemented to the jacket 51. The split between the two members of the composite plate 79 is also sealed by the disc 78 and the split between the member 81 and the extension 68 is sealed by the gasket 72. Although we have preferred the sealing means shown, our invention is not limited thereto. For example, if the disc 78 were omitted and the seal around the cable effected entirely by the flanged collar 88, the inside plate 74 and outer member 81 might be grooved to receive an O-ring between them.

The above described entrance permits access to the splice in the inner casing 14 without disturbing the seal between the plates and the cable core, as follows: After removing the clamps 53 and 24 (and the clamp corresponding to the clamp 24 at the opposite end of the splice box) breaking the seal 42 and sliding the plates 22 and 39 and outer housing 11 and liner 12 back along the cable, the wedging clamp 87 is opened and the two halves corresponding to the halves 26, 27 are removed and set ..iue. The member 81 is then removed to the left (as seen in the drawing) over the cable and the cylinder 13 turned until the ears 73 of the extension 68 are aligned with the spaces between the ears 76 of the plate 74. The wedging clamp corresponding to the clamp 87 on the right-hand side of the splice is also removed and the assembly comprising the cylinder 13 and extension 68 is passed over the plate 74 and inner member 82 to expose the splice. It is a feature of our invention that the clamp 92 and the seals between the plates 74, 79 and the cable jacket 51 are not disturbed when the splice is thus exposed. This is important since it provides a method for maintaining a pressure-tight chamber around the splice after repeatedly opening and closing the splice box.

In order to replace the seal of the outer casing the sealing disc 42 is made of a plurality of thicknesses each of which has a radial cut extending outwardly from the aperture so that it can be fitted over the cable when the cable end is not available. In making up a replaced seal the cuts are staggered so that no leakage can take place when the composite sealing disc is compressed between the plates.

Figure 2:
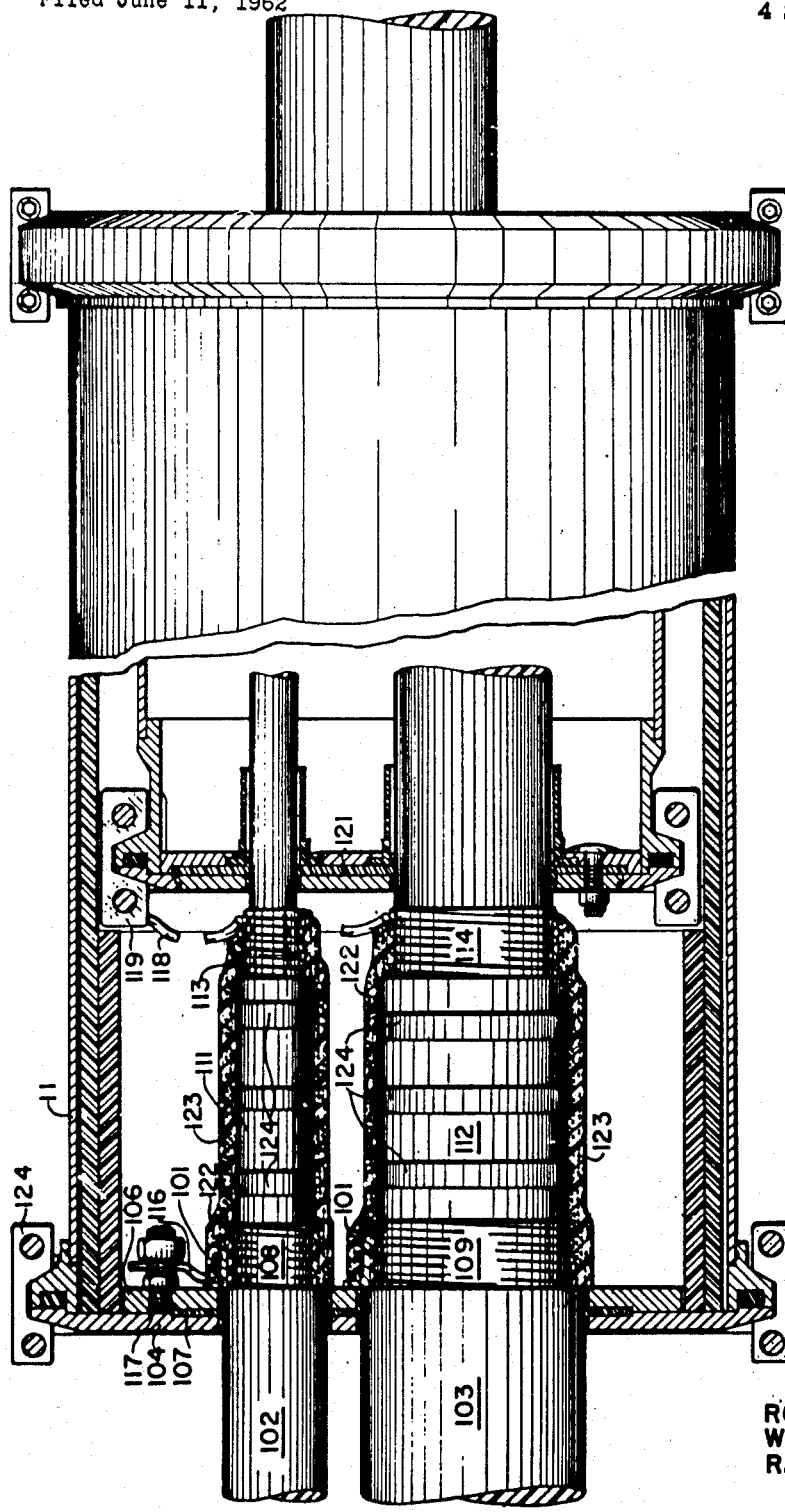
FIGURE 2 is a lengthwise sectionalized view of another embodiment of the splice box of our invention.

In the embodiment of our invention shown in FIGURE 2 the clamps 53 and 92 have been omitted and tensional stresses on the cables are transferred to the case by means of L-shaped stops 101 bonded to the sheaths. FIGURE 2 illustrates an entrance for two cables instead of one but the only difference that this requires is the provision of two apertures in the end plates and in the sealing discs. Here two cables 102, 103 pass through an outside plate 104 and an inside plate 106 and are sealed by a sealing compound disc 107 corresponding to the disc 42 of FIGURE 1. The outer jackets of both cables are terminated flush to the inside surface of the plate 106 and the sheaths 108, 109 under these jackets are terminated so as to expose a short length of each of the sheaths adjacent the plate 106. Inner jackets 111, 112 are terminated at a distance great enough to provide sufficient electrical tracking resistance and inner sheaths 113, 114 are also cut to expose a length of these sheaths adjacent the terminations of the jackets 111, 112. The exposure of the inner sheaths marks a difference from the embodiment of FIGURE 1 where the jacket 48 was cut flush with the plate 79. A grounding wire 116 is connected between the sheaths 108, 109 and a pin 117 threaded to the plate 106. Another grounding wire 118 is connected between the sheaths 113, 114 and a wedging clamp 119 which holds together an assembly 121 similar to the end plate assembly of the inner casing 14 of FIGURE 1. The surfaces of the exposed sheaths 108, 109, jackets 111, 112 and sheaths 113, 114 are coated with a suitable self-curing cement 122 such as an epoxy cement and a plurality of the L-shaped stops 101 are laid over the sheaths 108, 109 abutting the outer jackets of the respective cables 102, 103. A winding of cloth tape 123 is then applied over the horizontal portions of the stops 101 and the remainder of the cement-coated surfaces. Additional coatings of cement and layers of tape are alternately applied until a thick composite layer completely covers the exposed cables up to the wire 118. After the cement 122 has hardened and the plates 106, 107 been placed against the stops 101 and sealed and locked in position any tension in either of the cables 102, 103 will be transferred through the stops 101 to the plate 106. It should be noted that because of the excellent bond of epoxy cement to metal surfaces the sheaths 113 and 108 and the stops 101 are bonded into a monolithic termination that is not disturbed by repeated opening of the casing or by outside forces. Where the jackets 111, 112 are polyethylene we have found that although epoxy cements do not truly bond to such surfaces, if a plurality of annular wrappings 124 of adhesive tape are first applied to the surfaces 111, 112 at spaced intervals the cement will support a substantial load before shearing off of the cylindrical surface.

Figure 3:
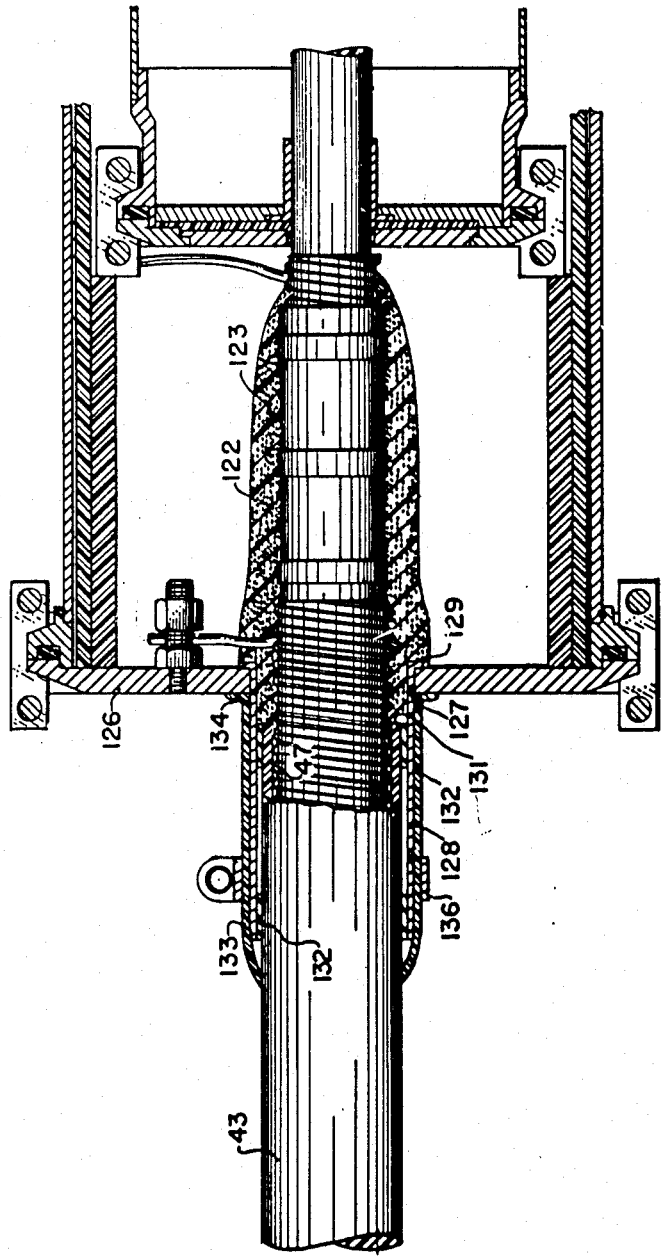
FIGURE 3 is an enlarged view of an entrance made to one embodiment of our invention.

In FIGURE 3 we show a method of sealing the outer bulkhead of our case without the necessity of replacing the sealing disc 42 or 107 each time the entrance is opened. Here the inside plate 39 is omitted and a single plate 126 has an aperture 127 for the cable 43.

A smooth-surfaced copper sleeve 128 fitting the aperture 127 has a circumferential shoulder 129 which abuts the inside surface of the plate 126. The outer jacket of the cable is terminated at a plane 131 within the sleeve 128 so that the sleeve extends over the jacket but some of the surface of the outer sheath 47 is also exposed under the sleeve 128. In this embodiment of our invention the cement 122, reinforced with the fibrous cloth 123, is applied in the manner described with relation to FIGURE 2 except that enough of the cement is forced under the sleeve 128 to obtain a firm bond between the sleeve 128 and the sheath 47. In order to provide more space under the sleeve 128 for cement 122, turns of tape 132 may be wrapped between the cable 43 and the sleeve 128. Over the metal sleeve 128 we fit a closely applied resilient sleeve 133 of a material such as rubber that will form a fluid-tight seal against the metal. The sleeve 133 is vulcanized or cemented firmly in a leakproof manner to the plate 126 at a circumferential bead 134 and the seal is further secured by a hose clamp 136.

The smooth surface of the metal sleeve 128 makes it possible to form a fluid-tight seal with the resilient sleeve 133 without the use of any adhesive between them whereas it would not be possible to form a tight seal with the jacket of the cable because of manufacturing variations in the surface and manufacturing tolerances in diameter and partichlarly because the convolutions of the sheath 47 result in ripples in the surface of the jacket.

We have invented a new and useful article of manufacture for which we desire an award of Letters Patent.

We claim:
1. A cable entrance seal comprising:
   (A) two closely spaced parallel plates having an aperture for said cable,
   (B) means forming a fluid-tight seal between said plates and said cable,
   (C) a clamp gripping said cable adjacent said plates,
      (a) said clamp comprising:
         (1) a plurality of arcuate sections of a cylinder,
         (2) means for tightening said sections in gripping relation around said cable,
         (3) means attaching each of said sections to one of said plates,
         (4) said attaching means passing through the other of said plates.
2. A cable entrance seal for a cable having a plurality of alternate concentric sheaths and jackets, comprising:
   (A) a first plate fitting over the outermost of said jackets,
   (B) means sealing said plate to said cable,
   (C) a second plate fitting over an inner of said sheaths,
   (D) means sealing said second plate to said cable,
   (E) a termination of said outermost jacket exposing the outermost of said sheaths adjacent to said first plate,
   (F) a termination of said outermost sheath between said plates exposing a length of said outermost sheath adjacent said first plate,
   (G) a termination of an inner of said jackets between said plates exposing a length of said inner jacket adjacent to said outermost sheath,
   (H) a plurality of spaced-apart wraps of adhesive tape bonded to said length of inner jacket,
   (I) a termination of an inner of said sheaths between said plates exposing a length of said inner sheath adjacent to said inner jacket,
   (J) a covering of fiber-reinforced, resin bonded to said exposed sheaths and bridging said exposed jacket.
3. A cable entrance seal for a cable having an outer jacket and an inner corrugated sheath comprising:
   (A) a plate having an aperture for said cable,
   (B) a smooth-surfaced, metal sleeve passing through said aperture and comprising:
      (a) a portion extending over said jacket,
      (b) a flange abutting said plate on the side away from said extending portion,
   (C) a snug-fitting resilient sleeve
      (a) sealingly bonded to said plate, and
      (b) surrounding said extending portion,
   (D) a termination of said jacket exposing said sheath adjacent said plate, and
   (E) resinous means forming a fluid-tight bond between said flange and said sheath.
4. A cable entrance comprising:
   (A) an entrance shoulder,
   (B) an inside plate surrounding said cable and abutting said shoulder,
   (C) an outside composite plate surrounding said cable,
      (a) said outside plate facing and extending radially beyond said inside plate, and
      (b) comprising:
         (1) inner and outer concentric members and

(2) a radially inwardly facing projection from said outer member,
(c) said inner member abutting said projection on the side of said projection facing said shoulder, and
(D) means urging said outer member toward said shoulder.

5. A cable entrance comprising:
(A) an entrance shoulder,
(B) an inside plate surrounding said cable,
(C) an outside composite plate surrounding said cable,
 (a) said outside plate facing and extending radially beyond said inside plate, and
 (b) comprising:
  (1) inner and outer concentric members, and
  (2) a radially inwardly facing projection from said outer member,
 (c) said inner member abutting said projection on the side of said projection facing said shoulder,
(D) means urging said outer member toward said shoulder, and
(E) means urging said inner plate toward said outer plate.

6. A cable entrance seal comprising:
(A) an entrance shoulder,
(B) an inside plate surrounding said cable and abutting said shoulder,
(C) an outside composite plate surrounding said cable,
 (a) said outside plate facing and extending radially beyond said inside plate and
 (b) comprising:
  (1) inner and outer concentric members, and
  (2) a radially inwardly facing projection from said outer member,
 (c) said inner member abutting said projection on the side of said projection facing said shoulder,
(D) fluid-tight sealing means between said plates and said cable,
(E) means urging said outer member toward said shoulder,
(F) fluid-tight sealing means between said outer member and said shoulder,
(G) fluid-tight sealing means between said inner and said outer members, and
(H) fluid-tight sealing means between said inside and said outside plates.

7. A cable entrance seal comprising:
(A) an entrance shoulder,
(B) an inside plate surrounding said cable,
(C) an outside composite plate surrounding said cable,
 (a) said outside plate facing and extending radially beyond said inside plate, and
 (b) comprising:
  (1) inner and outer concentric members, and
  (2) a radially inwardly facing projection from said outer member,
 (c) said inner member abutting said projection on the side of said projection facing said shoulder,
(D) fluid-tight sealing means between said plates and said cable,
(E) means urging said outer member toward said shoulder,
(F) means urging said inner plate toward said outer plate,
(G) fluid-tight sealing means between said outer member and said shoulder, and
(H) fluid-tight sealing means between said inside and said outside plates.

8. The entrance of claim 4 wherein said urging means is a wedging clamp.

9. The entrance of claim 5 wherein said outer member urging means is a wedging clamp.

10. A splice box for a cable having an inner core comprising:

(A) an outer tubular shell,
(B) tapered flanges at both ends of said shell,
(C) outer end plates at both ends of said shell,
 (a) said end plates comprising tapered peripheral surfaces matching the flanges of said shell, and
 (b) said plates having apertures fitting said cable,
(D) an inner tubular shell disposed within and spaced from said outer shell,
(E) tapered flanges at both ends of said inner shell,
(F) inner end plates at both ends of said inner shell,
 (a) said inner end plates comprising tapered peripheral surfaces matching the flanges of said inner shell, and
 (b) said inner end plates having apertures fitting said core,
(G) a wedging clamp fitting on the matching flanges of said inner end plates and said inner shell and holding said inner end plates to said inner shell, and
(H) a wedging clamp fitting on the matching flanges of said outer end plates and said outer shell and holding said outer end plates to said outer shell.

11. A splice box for a cable having an inner core comprising:
(A) an outer tubular shell,
(B) outer end plates at both ends of said shell
 (a) having apertures fitting said cable, and
 (b) comprising inside and outside facing plates,
(C) means clamping said outer end plates to said shell,
(D) an inner tubular shell disposed within and spaced from said outer shell,
(E) inner end plates at both ends of said inner shell having apertures fitting said core,
(F) means clamping said inner end plates to said inner shell,
(G) clamps gripping said cable adjacent said outer end plates,
 (a) said clamps comprising means fastened to said inside plates,
 (b) said means passing through apertures in said outside plates.

12. A splice box for a cable having a sheathed and jacketed core comprising:
(A) an outer tubular shell,
(B) outer end plates at both ends of said shell
 (a) having apertures fitting said cable, and
 (b) comprising inside and outside facing plates,
(C) means clamping said outer end plates to said shell,
(D) an inner tubular shell disposed within and spaced from said outer shell,
(E) inner end plates at both ends of said inner shell
 (a) having apertures fitting said core, and
 (b) comprising inside and outside facing plates,
(F) means clamping said inner end plates to said inner shell,
(G) clamps gripping said cable adjacent said outer end plates,
 (a) said clamps comprising means secured to said inside of said outer end plates,
 (b) said means passing through apertures in said outside of said outer end plates,
(H) clamps gripping said sheathed and jacketed core adjacent said inner end plates,
 (a) said clamps comprising means fastened to said inside of said inner end plates.
 (b) said means passing through apertures in said outside of said inner end plates.

13. A cable splice in a cable having a plurality of alternate concentric sheaths and jackets, comprising:
(A) an outer tubular shell,
(B) outer end plates sealed to said outer shell,
 (a) said outer end plates having an aperture fitting the outermost of said jackets,
(C) means forming a fluid-tight seal between said outer end plates and said cable, (D) said jacket terminating substantially flush with said outer end plates and exposing the outermost of said sheaths,
(E) an inner tubular shell disposed within said outer shell and spaced therefrom,
(F) inner end plates sealed to said inner shell,
   (a) said inner end plates having an aperture fitting said cable after stripping off two of said sheaths and two of said jackets,
(G) means forming a fluid-tight seal between said inner end plates and said cable,
(H) a termination of said outermost sheath between said outer and said inner end plates exposing a length of said outermost sheath adjacent the termination of said outermost jacket,
(I) a termination of an inner jacket between said inner and said outer end plates exposing a length of said inner jacket adjacent said outermost sheath,
(J) a termination of an inner of said sheaths between said inner and said outer end plates exposing a length of said inner sheath adjacent said inner jacket,
(K) a covering of fiber-reinforced resin bonded to said exposed sheaths and bridging said exposed jacket.

14. A cable splice in a cable having a plurality of alternate concentric sheaths and jackets, comprising:
(A) an outer tubular shell,
(B) outer end plates sealed to said outer shell,
   (a) said outer end plates having an aperture fitting the outermost of said jackets,
(C) means forming a fluid-tight seal between said outer end plates and said cable,
(D) said jacket terminating substantially flush with said outer end plates and exposing the outermost of said sheaths,
(E) an inner tubular shell disposed within said outer shell and spaced therefrom,
(F) inner end plates sealed to said inner shell,
   (a) said inner end plates having an aperture fitting said cable after stripping off two of said sheaths and two of said jackets,
(G) means forming a fluid-tight seal between said inner end plates and said cable,
(H) a termination of said outermost sheath between said outer and said inner end plates exposing a length of said outermost sheath adjacent the termination of said outermost jacket,
(I) at least one L-shaped stop fastened to said outermost sheath and abutting one of said outer end plates,
(J) a termination of an inner jacket between said inner and said outer end plates,
(K) a termination of an inner of said sheaths between said inner and said outer end plates exposing a length of said inner sheath adjacent said inner jacket,
(L) a covering of fiber-reinforced resin
   (a) bonded to said exposed sheaths,
   (b) bridging said exposed jacket, and
   (c) binding said stop to said outermost sheath.

References Cited in the file of this patent

UNITED STATES PATENTS

| | | |
|---|---|---|
| 2,650,259 | Marks | Aug. 25, 1953 |
| 2,835,723 | Killian et al. | May 20, 1958 |

FOREIGN PATENTS

| | | |
|---|---|---|
| 702,288 | Germany | Feb. 4, 1961 |

UNITED STATES PATENT OFFICE
CERTIFICATE OF CORRECTION

Patent No. 3,130,259 April 21, 1964

Robert A. Rischard et al.

It is hereby certified that error appears in the above numbered patent requiring correction and that the said Letters Patent should read as corrected below.

Column 2, line 24, for "pulse" read -- splice --; column 4, line 74, for "selling" read -- sealing --; column 6, line 9, for "partichlarly" read -- particularly --; column 8, line 65, strike out the period and insert a comma.

Signed and sealed this 4th day of August 1964.

(SEAL)
Attest:

ERNEST W. SWIDER
Attesting Officer

EDWARD J. BRENNER
Commissioner of Patents